US012596942B2

(12) United States Patent
Raykar et al.

(10) Patent No.: US 12,596,942 B2
(45) Date of Patent: Apr. 7, 2026

(54) BLACK-BOX EXPLAINER FOR TIME SERIES FORECASTING

(71) Applicant: INTERNATIONAL BUSINESS MACHINES CORPORATION, Armonk, NY (US)

(72) Inventors: Vikas C. Raykar, Bangalore (IN); Sumanta Mukherjee, Bangalore (IN); Nupur Aggarwal, Bangalore (IN); Bhanukiran Vinzamuri, Long Island City, NY (US); Arindam Jati, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 17/808,314

(22) Filed: Jun. 23, 2022

(65) Prior Publication Data

US 2023/0419136 A1    Dec. 28, 2023

(51) Int. Cl.
*G06N 5/045*      (2023.01)
*G06N 5/022*      (2023.01)

(52) U.S. Cl.
CPC ............. *G06N 5/045* (2013.01); *G06N 5/022* (2013.01)

(58) Field of Classification Search
None
See application file for complete search history.

(56) References Cited

U.S. PATENT DOCUMENTS

| | | | |
|---|---|---|---|
| 9,578,046 B2 | 2/2017 | Baker | |
| 11,386,342 B2 * | 7/2022 | Chan | G06N 7/00 |
| 2015/0235139 A1 | 8/2015 | Sharma | |
| 2019/0325333 A1 * | 10/2019 | Chan | G06F 18/2163 |

FOREIGN PATENT DOCUMENTS

CN        111753995 A      10/2020

OTHER PUBLICATIONS

Schlegal et al., TS-MULE: Local Interpretable Model-Agnostic Explanations for Time Series Forecast Models, arXiv:2109.08438v1 [cs.LG] Sep. 17, 2021; Total pp. 10 (Year: 2021).*
Ozyegen et al., Evaluation of Local Explanation Methods for Multivariate Time Series Forecasting, arXiv:2009.09092v1 [cs.LG] Sep. 18, 2020; Total pp. 13 (Year: 2020).*
(Continued)

*Primary Examiner* — Alan Chen
(74) *Attorney, Agent, or Firm* — Scott Dobson

(57)          ABSTRACT
A method, system, and computer program product for an interpretable, feature-based post-hoc black box explainer for univariate time series forecasters are provided. The method receives a set of time series forecasting predictions. The set of time series forecasting predictions are generated from a set of black-box models trained with an initial data set. The method generates a set of features based on at least a portion of the initial data set. A set of surrogate models are trained based on the set of time series forecasting predictions and at least a portion of the set of features. A subset of surrogate models is selected. Based on the subset of surrogate models, the method generates one or more explanation outputs for time series forecasting predictions of the set of black-box models.

17 Claims, 11 Drawing Sheets

(56)                  References Cited

OTHER PUBLICATIONS

Visani et al., Statistical stability indices for LIME: obtaining reliable explanations for Machine Learning models, arXiv:2001.11757v2 [cs.LG] Nov. 12, 2020; Total pp. 18 (Year: 2020).*

Rajapaksha et al., LoMEF: A Framework to Produce Local Explanations for Global Model Time Series Forecasts; arXiv:2111. 07001v1 [cs.LG] Nov. 13, 2021; Total pp. 46 (Year: 2021).*

"Erratum regarding missing Declaration of Competing Interest statements in previously published articles" International Journal of Forecasting, 2021, pp. 1310-1311.

Anonymous, "Explaining Time Series by Counterfactuals," ICLR, 2020, 16 pages.

Fulcher, et al., "Feature-based time-series analysis," arXiv:1709. 08055v2 [cs.LG] Oct. 3, 2017, 28 pages, Monash Institute for Cognitive and Clinical Neurosciences, Monash University, Melbourne, Victoria, Australia.

Ilic et al., "Explainable boosted linear regression for time series forecasting," arXiv:2009.09110v1, Sep. 18, 2020, 35 pages.

Li, et al., "Forecasting with time series imaging," arXiv:1904. 08064v3, Jun. 5, 2020, 30 pages.

Lundberg, et al., "A Unified Approach to Interpreting Model Predictions," arXiv:1705.07874v2, Nov. 25, 2017, 10 pages.

Mell et al., "The NIST Definition of Cloud Computing," Recommendations of the National Institute of Standards and Technology, U.S. Department of Commerce, Special Publication 800-145, Sep. 2011, 7 pgs.

Montero-Manso et al., "FFORMA: Feature-based Forecast Model Averaging," Monash Business School Department of Econometrics and Business Statistics, Jan. 16, 2019, 12 pages.

Rajapaksha et al., "LoMEF: A Framework to Produce Local Explanations for Global Model Time Series Forecasts," arXiv:2111. 07001v1, Nov. 13, 2021, 46 pages.

Saluja et al., "Towards a Rigorous Evaluation of Explainability for Multivariate Time Series," arXiv:2104.04075v1, Apr. 6, 2021, 24 pages.

Schlegel et al., "Towards A Rigorous Evaluation Of XAI Methods On Time Series," arXiv:1909.07082v2, Sep. 17, 2019, 6 pages.

* cited by examiner

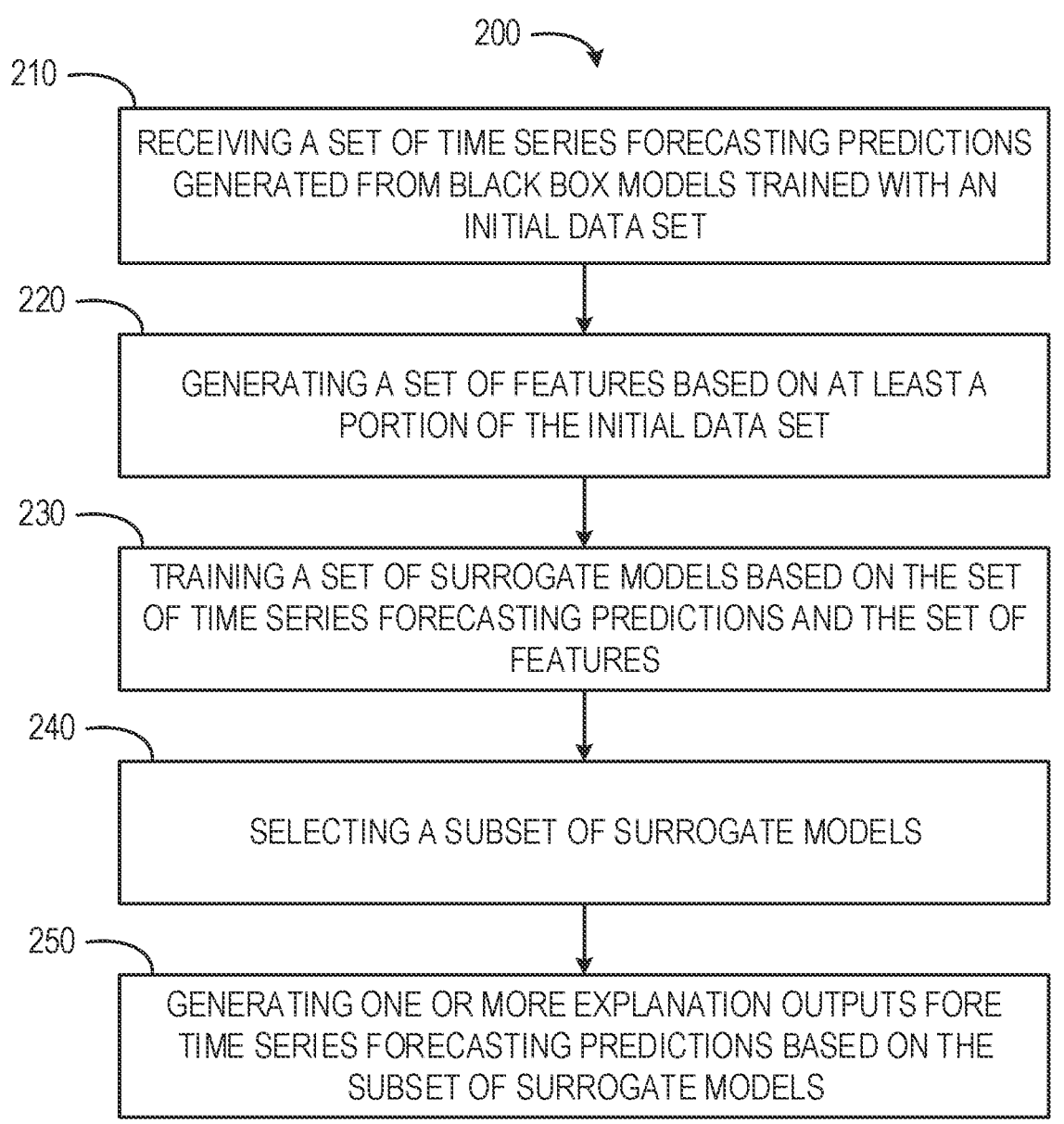

200

210 — RECEIVING A SET OF TIME SERIES FORECASTING PREDICTIONS GENERATED FROM BLACK BOX MODELS TRAINED WITH AN INITIAL DATA SET

220 — GENERATING A SET OF FEATURES BASED ON AT LEAST A PORTION OF THE INITIAL DATA SET

230 — TRAINING A SET OF SURROGATE MODELS BASED ON THE SET OF TIME SERIES FORECASTING PREDICTIONS AND THE SET OF FEATURES

240 — SELECTING A SUBSET OF SURROGATE MODELS

250 — GENERATING ONE OR MORE EXPLANATION OUTPUTS FORE TIME SERIES FORECASTING PREDICTIONS BASED ON THE SUBSET OF SURROGATE MODELS

FIG. 2

WEEKLY SALES FOR RETAILER 2017 TO 2019

--- SURROGATE
--- FORECAST
---- TEST
— TRAIN

7528

5027

5410

JUL 1, 2019

SALES 8000
6000
4000
2000
0

JAN 2017  JUL 2017  JAN 2018  JUL 2018  JAN 2019

DATE

PLOT_EXPLANATION(EXPLANATION = EXPLANATION_LOCAL[H])

HIGHER ⇄ LOWER

BASE VALUE

-1.551  -550.8  449.2  1,449  2,449  3,449  4,44  5,028.74 49  6,449

DAY OF YEAR SALES (T-1*52) SALES (T-1) DISCOUNT (T) SALES (T-2*52) YEAR

800

810

GENERATING A SURROGATE DATA SET INCLUDING A SURROGATE TRAINING SET AND A SURROGATE TESTING SET

820

TRAINING A SET OF SURROGATE MODELS WITH THE SURROGATE TRAINING SET

830

EVALUATING THE SET OF SURROGATE MODELS WITH THE SURROGATE TESTING SET

840

FITTING THE SET OF SURROGATE MODELS USING ONE OR MORE TREE-BASED REGRESSORS

BLACK-BOX EXPLAINER FOR TIME SERIES FORECASTING

BACKGROUND

A time series is a graph depicting and associating values with points in time. Time series forecasting is used to predict or forecast future time series data. The future time series data is forecast using historical time series data. Benefits of time series data often depend on related external regressors or multiple external time series. Each external regressor is a time series and can be included by some methods to improve time series forecasting. Time series forecasting is often performed using black box models.

Explainability for time series forecasting is considered to be a degree to which a human can understand a cause of a decision or prediction made by a model. Explainability for time series forecasting can be presented on local, semi-local, global levels. Local explanations provide information relating to a forecast at a certain point in time. Semi-local explanations provide information relating to an overall forecast made by a forecaster in a certain time interval. Global explanations provide information relating to a forecaster trained on a historical time series.

SUMMARY

According to an embodiment described herein, a computer-implemented method for an interpretable, feature-based post-hoc black box explainer for univariate time series forecasters is provided. The method receives a set of time series forecasting predictions. The set of time series forecasting predictions are generated from a set of black-box models trained with an initial data set. The method generates a set of features based on at least a portion of the initial data set. A set of surrogate models are trained based on the set of time series forecasting predictions and at least a portion of the set of features. A subset of surrogate models is selected. Based on the subset of surrogate models, the method generates one or more explanation outputs for time series forecasting predictions of the set of black-box models.

According to an embodiment described herein, a system for an interpretable, feature-based post-hoc black box explainer for univariate time series forecasters is provided. The system includes one or more processors and a computer-readable storage medium, coupled to the one or more processors, storing program instructions that, when executed by the one or more processors, cause the one or more processors to perform operations. The operations receive a set of time series forecasting predictions. The set of time series forecasting predictions are generated from a set of black-box models trained with an initial data set. The operations generate a set of features based on at least a portion of the initial data set. A set of surrogate models are trained based on the set of time series forecasting predictions and at least a portion of the set of features. A subset of surrogate models is selected. Based on the subset of surrogate models, the operations generate one or more explanation outputs for time series forecasting predictions of the set of black-box models.

According to an embodiment described herein, a computer program product for an interpretable, feature-based post-hoc black box explainer for univariate time series forecasters is provided. The computer program product includes a computer-readable storage medium having program instructions embodied therewith, the program instructions being executable by one or more processors to cause the one or more processors to receive a set of time series forecasting predictions. The set of time series forecasting predictions are generated from a set of black-box models trained with an initial data set. The computer program product generates a set of features based on at least a portion of the initial data set. A set of surrogate models are trained based on the set of time series forecasting predictions and at least a portion of the set of features. A subset of surrogate models is selected. Based on the subset of surrogate models, the computer program product generates one or more explanation outputs for time series forecasting predictions of the set of black-box models.

BRIEF DESCRIPTION OF THE DRAWINGS

FIG. 2 depicts a flow diagram of a computer-implemented method for a post-hoc black box explainer for univariate time series forecasters, according to at least one embodiment.

DETAILED DESCRIPTION

Figure 1:
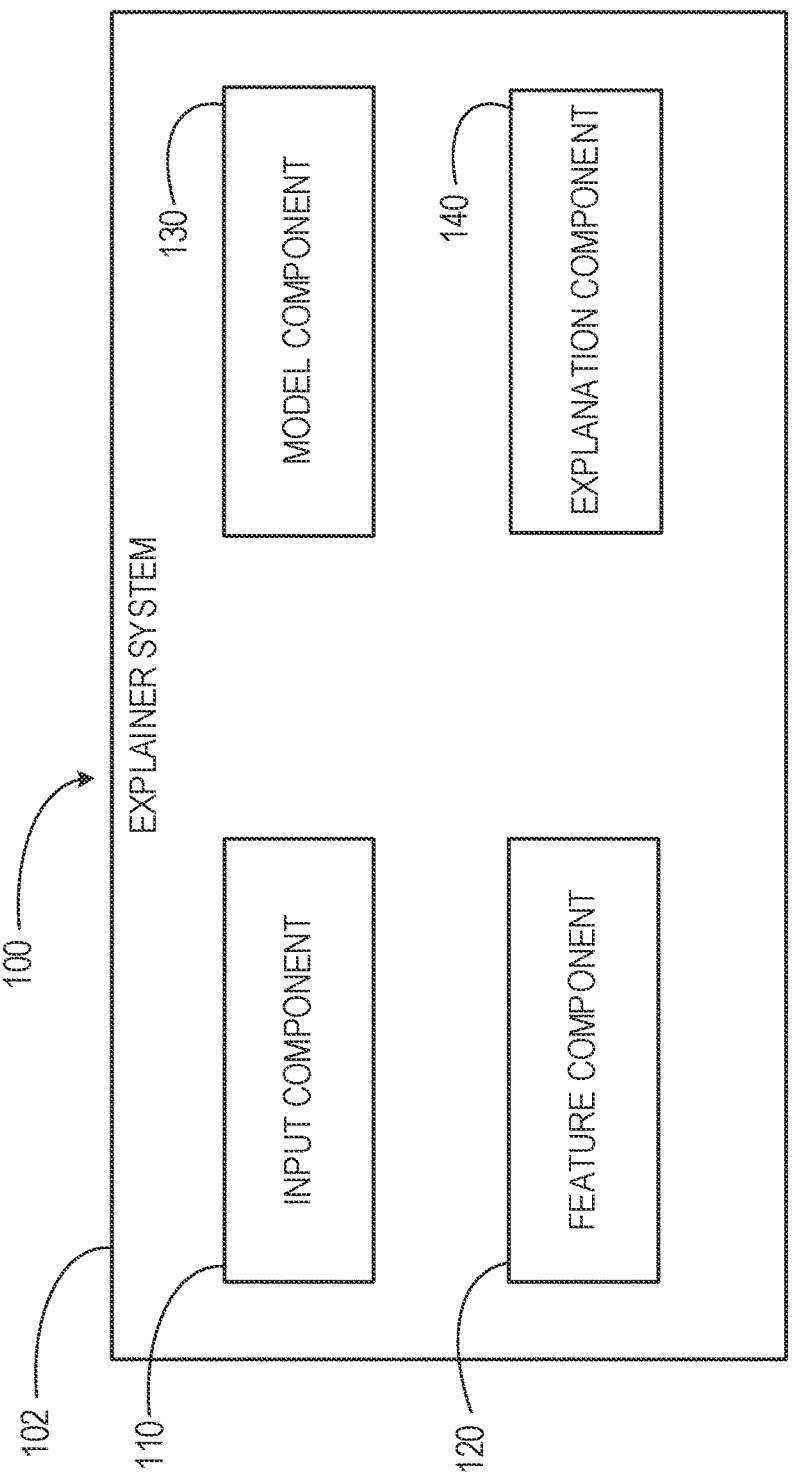
FIG. 1 depicts a block diagram of a computing environment for implementing concepts and computer-based methods, according to at least one embodiment.

The present disclosure relates generally to methods for black box explainer algorithms. More particularly, but not exclusively, embodiments of the present disclosure relate to a computer-implemented method for a post-hoc black box explainer for univariate time series forecasters. The present disclosure relates further to a related system for black box explainer algorithms, and a computer program product for operating such a system.

Time series information can be provided as graphical depictions associating values with points in time. For example, time series information may provide daily sales of products associated with daily inventory levels. Time series forecasting may predict or forecast future time series data based on historical time series data. Time series forecasting may be useful in various domains including manufacturing, supply chain, weather, sensor networks, health sciences, and other fields. Time series forecasting can rely on several external time series. The external time series may be understood as related external regressors. Each external regressor may be a separate time series, and it may be useful to select individual external regressors for inclusion in a time series forecast to improve or tailor that forecasting.

Time series forecasting is often performed using black box models. Black box models may provide adequate prediction capabilities. However, black box models may inhibit clear explanation, visualization, and understanding of how predictions are made and what elements and relative weights impact such predictions.

Explainability may be understood as a degree to which a human can understand a cause of a decision made by a prediction model, such as a black box model performing time series forecasting. Explainers are algorithms that generate local, semi-local, and global explanations for a forecasting algorithm or model. Local explanations may explain a forecast made by a forecasting model at a certain point in time. For example, the local explanation may provide information on a specified value within a time series forecast being above a specified average and what impact a change may have on that specified value. Semi-local explanations may provide information for an overall forecast made by a forecasting model in a certain time interval. The semi-local explanation may return a single example aggregated over all the multiple time steps within a forecasted horizon. For example, the semi-local explanation may provide an explanation for a forecast being above or below an estimated value over a certain time period and an impact across that time period for a change in a specified initial value. Global explanations may explain a forecast made by a forecasting model trained on historical time series. For example, explaining what are the most important attributes the forecasting model relied on to make the forecast and what impact a change will make on the forecast.

Directly interpretable explainers may be interpretable by humans by design. White box explainers may be explained if access is provided to internal operations of a corresponding forecast algorithm or model. Black box explainers are model agnostic. Black box explainers often require access to a model's predictions and fit functions. Where a source black box model is provided, a black box explainer may generate explanations for aspects of predictions generated from black box models. However, explainers are often unable to explain width of prediction intervals and mean forecasts. Further, current semi-local explanations describing a range of time points are unable to be used for black box models.

Embodiments of the present disclosure provide interpretable and feature-based black box explainers. The present disclosure enables the generation of post-hoc black box explainer algorithms that explain forecasts of black box models. Some embodiments of the present disclosure may provide post-hoc black box explainer algorithms to explain forecasts of univariate time series forecasters. Such post-hoc black box explainer algorithms incorporate tree-based regressors to build surrogate models and Shapley additive explanations (SHAP) values for explanations. Some embodiments of the present disclosure explain width of prediction intervals along with mean forecasts. The present disclosure generates semi-local explanations, including ranges of timepoints, for timeseries data using black box models. Some embodiments of the present disclosure generate robust explanations based on block bootstraps.

Some embodiments of the concepts described herein may take the form of a system or a computer program product. For example, a computer program product may store pro-gram instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include an explainer system 102. The explainer system 102 may comprise an input component 110, a feature component 120, a model component 130, and an explanation component 140. The input component 110 receives sets of time series forecasting predictions generated from sets of black box models. The feature component 120 generates sets of features from data sets used to train the sets of black box models. The model component 130 trains and selects surrogate models from the sets of time series forecasting predictions. The explanation component 140 generates explanation outputs and user interface graphics or depictions to explain aspects, elements, trends, and relative feature contributions for time series forecasting predictions of black box models. Although described with distinct components, it should be understood that, in at least some embodiments, components may be combined or divided, and/or additional components may be added without departing from the scope of the present disclosure.

Referring now to FIG. 2, a flow diagram of a computer-implemented method 200 is shown. The computer-implemented method 200 is a method for a post-hoc black box explainer for univariate time series forecasters. In some embodiments, the computer-implemented method 200 may be performed by one or more components of the computing environment 100, as described in more detail below.

At operation 210, the input component 110 receives a set of time series forecasting predictions. In some embodiments, the set of time series forecasting predictions are generated from a set of black box models. The set of black box models are trained with an initial data set. The set of time series forecasting predictions may be received along with the initial data set, or a portion thereof. In some embodiments, the set of time series forecasting predictions are received by the input component 110, and the initial data set is discoverable based on the set of time series forecasting predictions.

At operation 220, the feature component 120 generates a set of features based on at least a portion of the initial data set. The set of features may be a set of interpretable features of a model. In some instances, the set of features include lag features, seasonal lag features, rolling window features, expanding window features, date features, time features, encoding cyclical features, holiday features, trend features, combinations thereof, and any other suitable interpretable feature.

In some embodiments, the feature component 120 generates the set of features by identifying a global feature set for a training data set. The training data set may be at least a portion of the initial data set. The initial data set may be an original training time series for the set of black box models. In some embodiments, the training data set is a portion of the initial data set which is subject to one or more data perturbation operations. In some instances, once the global feature set is identified, the feature component 120 selects a subset of features from the global feature set as the set of features.

At operation 230, the model component 130 trains a set of surrogate models. In some embodiments, the model component 130 trains the set of surrogate models based on the set of time series forecasting predictions and at least a portion of the set of features. The set of surrogate models may be trained to predict forecasts from the black box models. In some instances, at least one surrogate model of the set of surrogate models mimic at least one black box model of the set of black box models, with respect to model output.

At operation 240, the model component 130 selects a subset of surrogate models. In some instances, the model component 130 selects the subset of surrogate models based on ease of interpretation. The subset of surrogate models may be selected based on features used in the models, feature importance, model simplicity, or any other suitable interpretable aspect. In some instances, the model component 130 selects the subset of surrogate models based on a comparison of surrogate forecasting predictions generated by the surrogate models and the time series forecasting predictions of the set of black box models. In such instances, the model component 130 selects surrogate models for inclusion in the subset of surrogate models which produce surrogate forecasting predictions closest to one or more time series forecasting predictions of at least one black box model. In some embodiments, the model component 130 selects the subset of surrogate models as surrogate models producing surrogate forecasting predictions closest to those of the set of black box models and with respect to ease of interpretation.

At operation 250, the explanation component 140 generates one or more explanation outputs. The one or more explanation outputs may be generated based on the subset of surrogate models. In some embodiments, the explanation component 140 generates the explanation outputs for time series forecasting predictions of the set of black box models. In some embodiments, the explanation outputs are generated by an explainability algorithm such as TreeSHAP. In such instances, an explainability algorithm may generate an explanation in terms of features that encode a given time series. Although described with respect to a specific explainability algorithm, it should be understood that the explanation component 140 may use any suitable and relevant explainability method, algorithm, or operations to explain the output of a selected surrogate model or subset of surrogate models. Some explainability algorithms may use game theoretic approaches to connect optimal feature allocation with local explanations using specified values from game theory and related extensions, such as SHAP values. SHAP value may indicate a relative contributions of features to an output of a row's prediction. SHAP values may be used in cooperative game theory to increase transparency and interpretability of machine learning models. FIGS. 3-8 depict one or more explanation outputs of the explanation component 140.

Explanation outputs may include naive graphs, seasonal naive graphs, moving average graphs, simple exponential smoothing graphs, prophet graphs, XGBoost graphs, combinations thereof, or any other suitable visual depictions providing explanations of the set of black box models. Naive graphs may depict a forecast of a value of a last observation. Seasonal naive graphs may depict forecasts for the value of the last observation from the same season of the year. For example, with monthly data, the forecast for all future February values may be equal to the last observed February value. Moving average graphs may provide depictions of a moving average forecast of order as the mean of the last k observations of the time series. Simple exponential smoothing graphs may depict a forecast that is the exponentially weighted average of its past values. This forecast depiction can also be interpreted as a weighted average between the most recent observation and the previous forecast. The prophet graph may be a depiction of forecast time series data based on an additive model where non-linear trends are fit with yearly, weekly, and daily seasonably, as well as holiday effects. XGBoost graphs may depict forecasting to regression reduction using XGBoost.

The one or more explanation outputs may explain a mean and a prediction interval for the set of time series forecasting predictions of the set of black box models. The one or more explanation outputs may explain the prediction intervals based on a relative contribution of features or each feature to a specified black box model. Prediction intervals may be explained with respect to the width of an interval. In such instances, instead of regressing on the mean forecast from the forecaster, the explanation component 140 may regress on the width of the prediction interval.

In some instances, the one or more explanation outputs are feature-based explanations. For example, the feature-based explanation may explain the outputs of the black box models in terms of features that encode the time series (e.g., lag features and date encodings) and external regressors. In some instances, the one or more explanation outputs are instance-based explanations. For example, the instance-based explanation may explain the black box models in terms of importance of certain time points within a historical time series.

Figure 3:
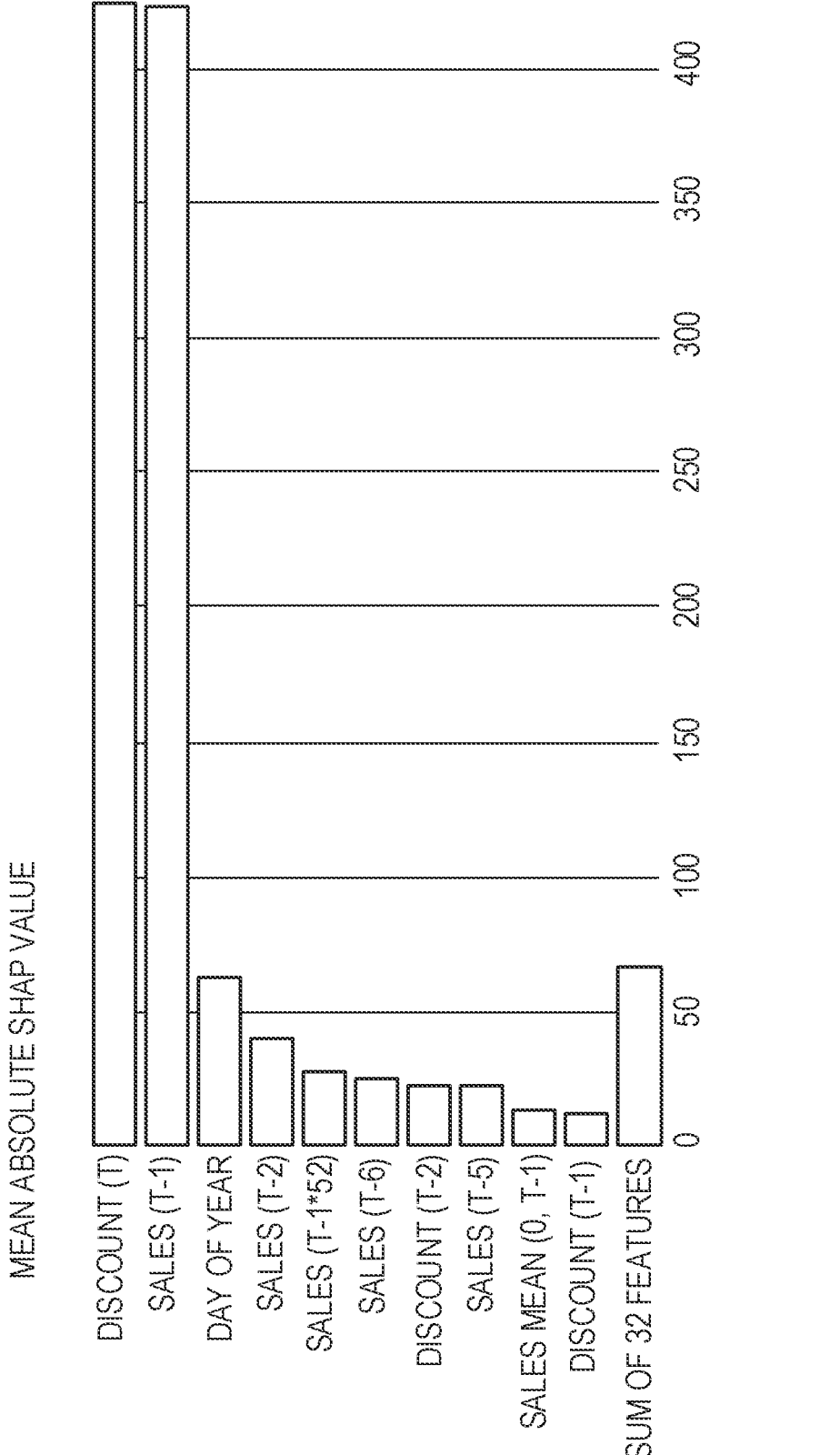
FIG. 3 depicts a graphical user interface depiction of an explanation output, according to at least one embodiment.
Figure 4:
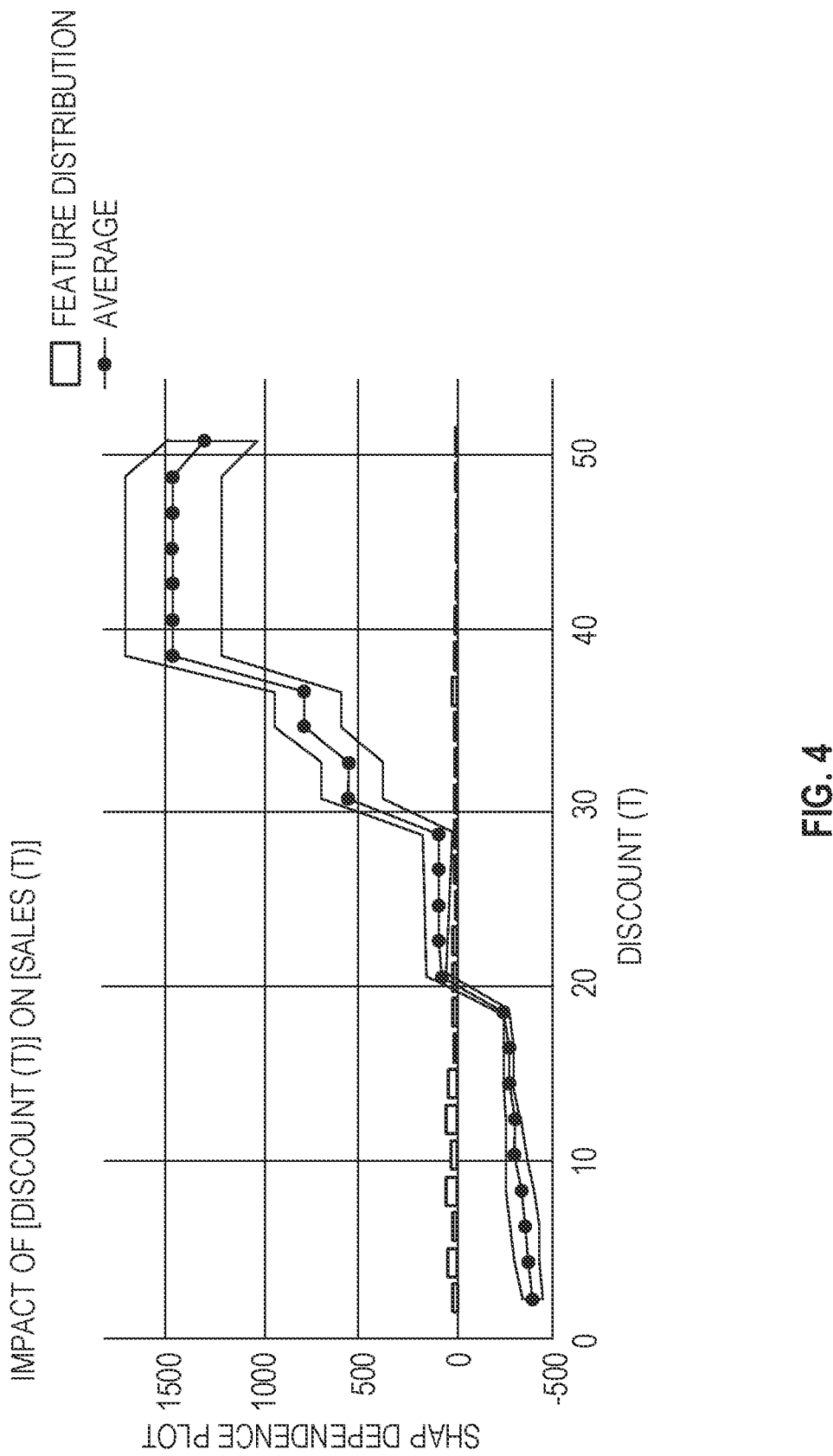
FIG. 4 depicts a graphical user interface depiction of an explanation output, according to at least one embodiment.

In some embodiments, the explanation component 140 generates one or more explanation outputs by aggregating explanation outputs of each surrogate model of the subset of surrogate models. Explanation outputs may be local, semi-local, and global. Global explanation outputs may explain the black box model trained on historical time series. With respect to feature-based explanation, global explanation outputs may provide relative contributions of each feature to a given model. A higher value, when compared to another feature, may suggest the feature is more important for generating a time series forecast. Feature importance may provide a score that indicates how useful or valuable each feature was in the construction of boosted decision trees within the model. Where the global explanation incorporates SHAP feature importance, as shown in FIG. 3, the importance score of each feature may be based on SHAP values, such as a mean absolute value of a SHAP value for each feature across an entire data set. SHAP values may be computed for each feature and each sample. The explanation component may then calculate the mean absolute value of the SHAP values for each feature to obtain a feature importance score for each feature. Global explanation outputs may provide partial dependence plots (PDP) for a feature, as in FIG. 4. The PDP may show the marginal effect a feature has on a given forecast. The PDP may display an average prediction in a dataset and changes that occur as a result of a change in a particular feature. A partial dependence function at a particular feature value may represent an average prediction if all data points are forced to assume that feature value. Global explanation outputs may also display SHAP dependence plots (SDP) for each feature. SDP may show a mean SHAP value for a particular feature across the entire data set. These outputs may show how a model depends on a given feature. Further, these outputs may provide a richer extension of classical PDP.

Figure 5:
FIG. 5 depicts a graphical user interface depiction of an explanation output, according to at least one embodiment.
Figure 6:
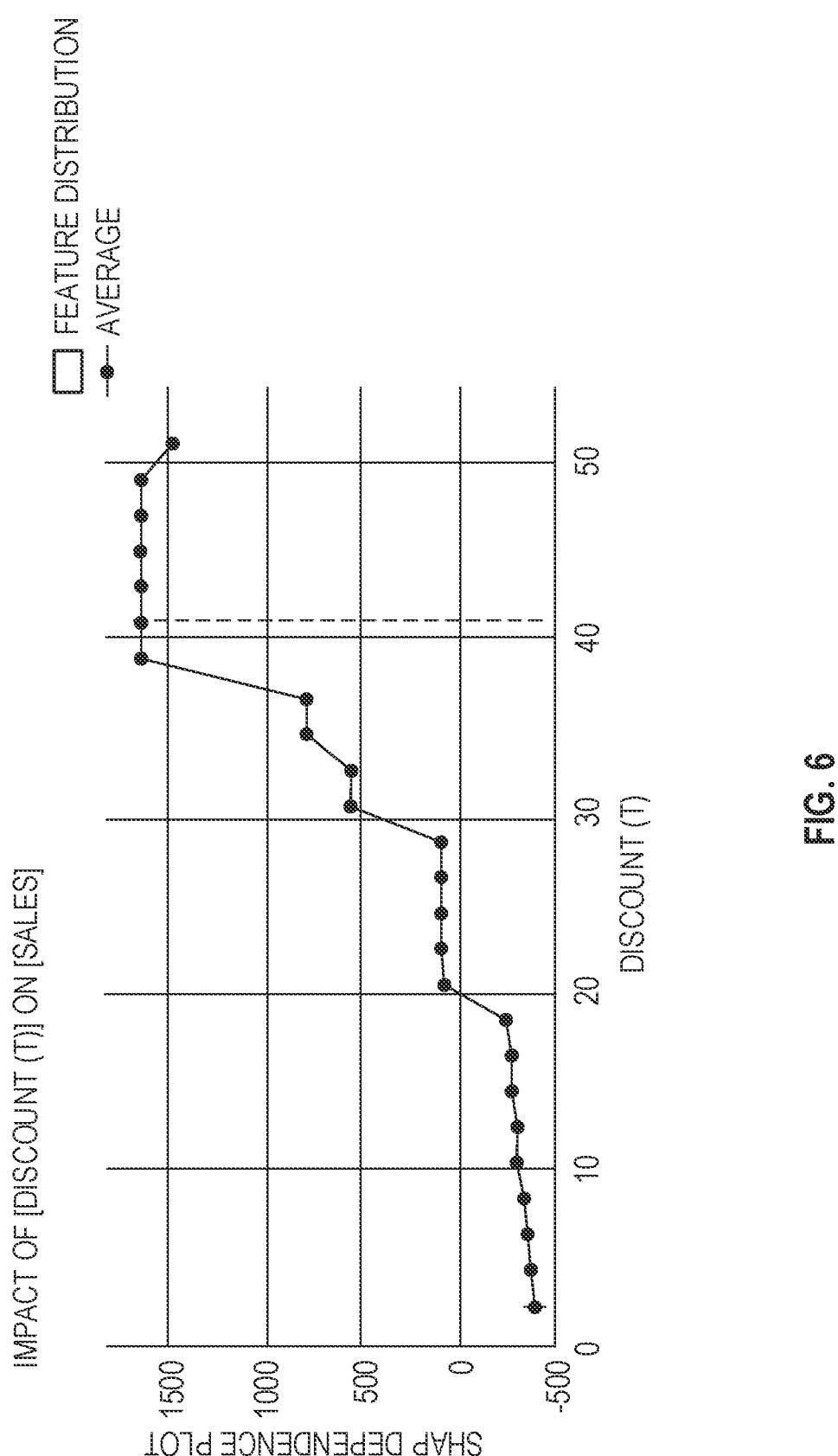
FIG. 6 depicts a graphical user interface depiction of an explanation output, according to at least one embodiment.

Local explanation outputs may explain a forecast made by a black box model at a certain point in time. Where local explanations incorporate SHAP features, the SHAP explanation may show features contributing to push the forecasted values from a base value to the forecaster model output, as shown in FIG. 5. Features pushing the forecast higher may be shown in a first color (e.g., blue), where features pushing a forecast lower are shown in a second color, distinct from the first (e.g., red). Local explanations may include local PDP for a given feature. The local PDP may show how a forecast of a surrogate model varies as the feature value changes. Where local explanations include local SDP, the local SDP for a given feature may show how the SHAP value varies as the feature value changes, as shown in FIG. 6.

Figure 7:
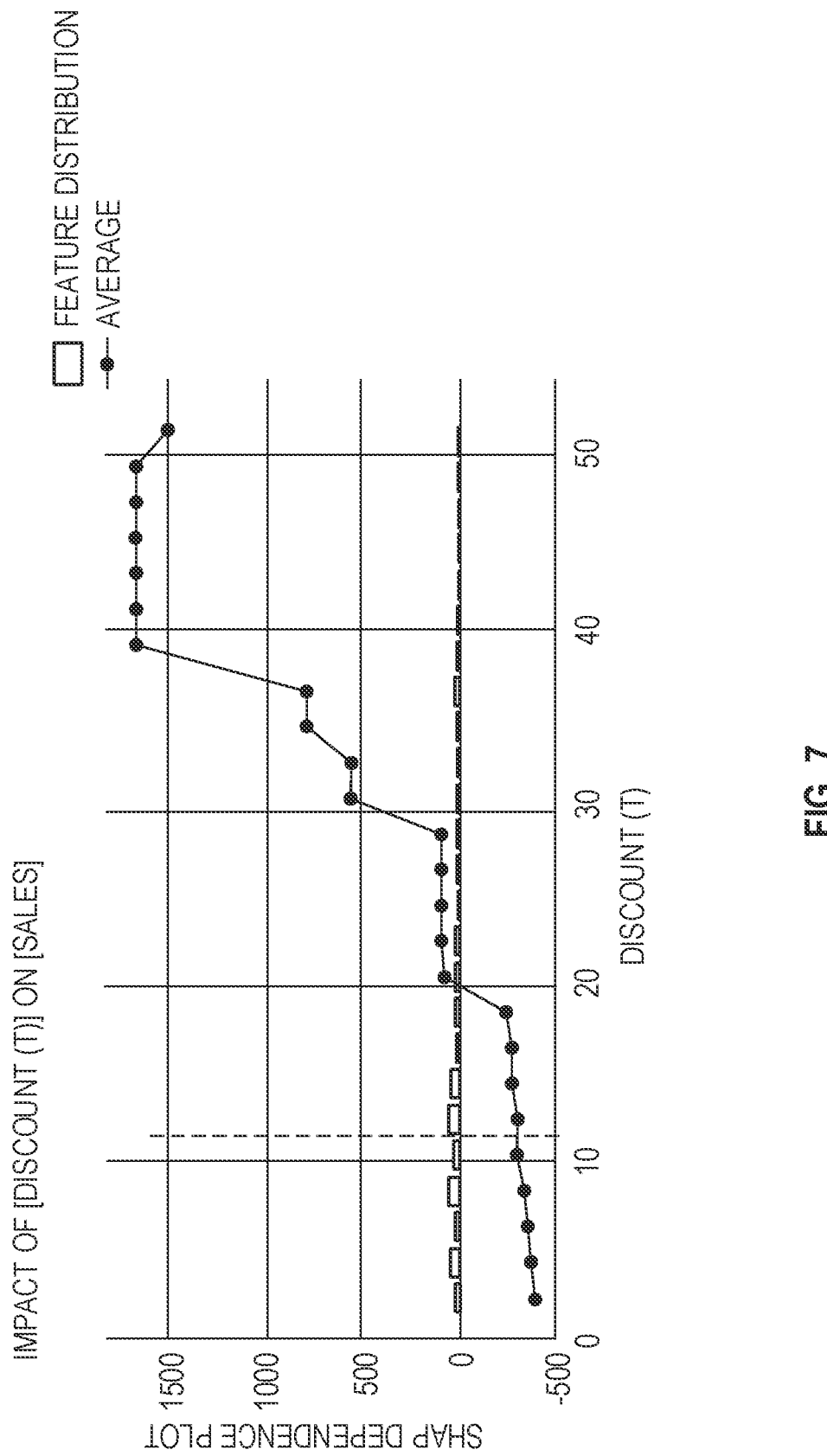
FIG. 7 depicts a graphical user interface depiction of an explanation output, according to at least one embodiment.

Semi-local explanations may explain the overall forecast made by a forecaster in a certain time interval. Semi-local explanations may include SHAP feature importance outputs. These outputs may provide an importance score for each feature which is the corresponding SHAP value for that feature. Where semi-local explanations include PDP, the output may provide PDP for a given feature showing how the forecast from a surrogate model varies as the feature value changes. Semi-local explanations including SDP may show SDP for a given feature and display how the SHAP value varies as the feature value changes, as shown in FIG. 7.

In some embodiments, the quality of the feature-based explanations may be evaluated in terms of sensitivity, faithfulness, and complexity. With respect to faithfulness, feature importance scores should correspond to the importance features for a function, such that when a particular set of features is set to a baseline value, the change in predictor's output should be proportional (measured via correlation) to the sum of the attribution scores of the features. The baseline in such instances can be the mean of the training data. With respect to sensitivity, if inputs are near each other and their model outputs are similar, then the input explanations should be close to each other within a neighborhood of datapoints. With respect to complexity, a complex explanation is one that uses all the features in the explanation. A simplest explanation would be concentrated on one feature. In such cases, complexity may be defined as the entropy of a fractional contribution distribution. To improve sensitivity, the approach of the present disclosure may be extended by aggregating multiple explanations from bootstrapped versions of a time series. In such instances, bootstrapped time series may be generated on a block bootstrap algorithm.

Figure 8:
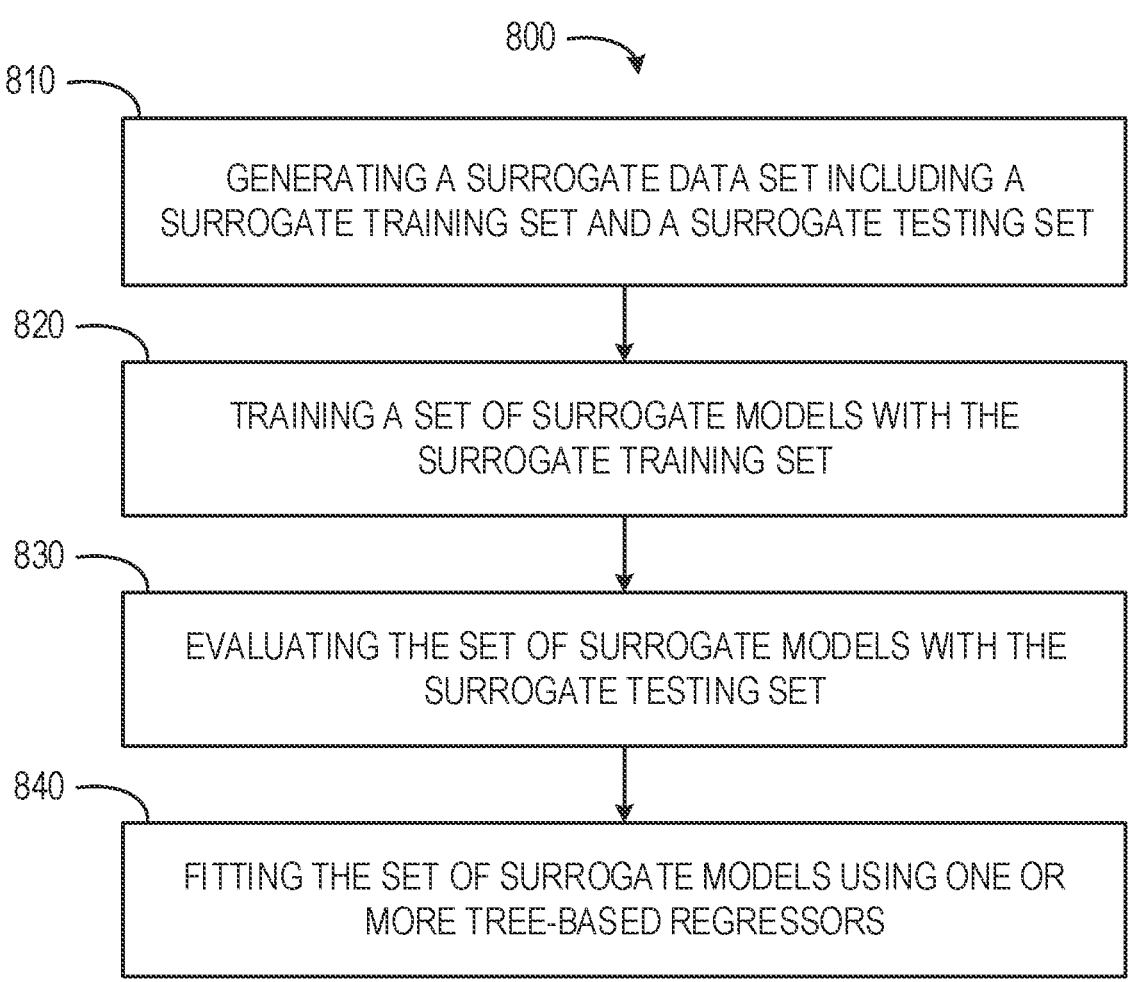
FIG. 8 depicts a flow diagram of a computer-implemented method for a post-hoc black box explainer for univariate time series forecasters, according to at least one embodiment.

FIG. 8 shows a flow diagram of an embodiment of a computer-implemented method 800 for a post-hoc black box explainer for univariate time series forecasters. The method 800 may be performed by or within the computing environment 100. In some embodiments, the method 800 comprises or incorporates one or more operations of the method 200. In some instances, operations of the method 800 may be incorporated as part of or sub-operations of the method 200.

In operation 810, the model component 130 generates a surrogate data set. The surrogate data set may be generated by backtesting one or more time series forecasting predictions of the set of time series forecasting predictions. The model component 130 may generate the surrogate data set for a univariate time series as a sequence of backtested historical forecasts using an expanding window splitter. In some embodiments, the surrogate data set includes a surrogate training set and a surrogate testing set. The surrogate training set may be generated as a train split of the expanding window splitter. The surrogate testing set may be concatenated to establish backtested historical forecasts for each step of a forecast horizon.

In operation 820, the model component 130 trains the set of surrogate models based on the set of time series forecasting predictions. In some embodiments, the model component 130 trains the set of surrogate models with the surrogate training set. In some instances, the set of surrogate models are tree-based surrogate models. In such instances, a surrogate time series forecasting task may be reduced to a supervised regression problem. For each time point, a feature vector may be generated based on differing features to be predicted. For each time point, feature vectors may also be generated based on which feature vectors are to be used to predict in-sample prediction time series values.

In operation 830, the model component 130 evaluates the set of surrogate models with the surrogate testing set. The set of surrogate models may be evaluated by comparing outputs of the set of surrogate models, in response to the surrogate testing set, to outputs of one or more black box models of the set of black box models.

In operation 840, the model component 130 trains the set of surrogate models by fitting the set of surrogate models. In some embodiments, the set of surrogate models are fitted using one or more tree-based regressors. Tree-based regressors may include regressors such as XGBoost, CatBoost, LightGBM, or any other suitable regressors. In some instances, the set of surrogate models are fitted using tree-based regressors based on a set of feature vectors. The set of feature vectors may be associated with a set of time points associated with the surrogate training set.

The model component 130 may train surrogate models as single regressor models. Single regressors models may be fit for one-step-ahead forecast horizons. The single regressor model may then be called recursively to predict multiple steps ahead. In some instances, the model component 130 trains surrogate models as separate regressor models. The separate regressor models may be fit for each step ahead in the forecast horizon. The separate regressor models may then be independently applied to predict multiple steps ahead.

Figure 9:
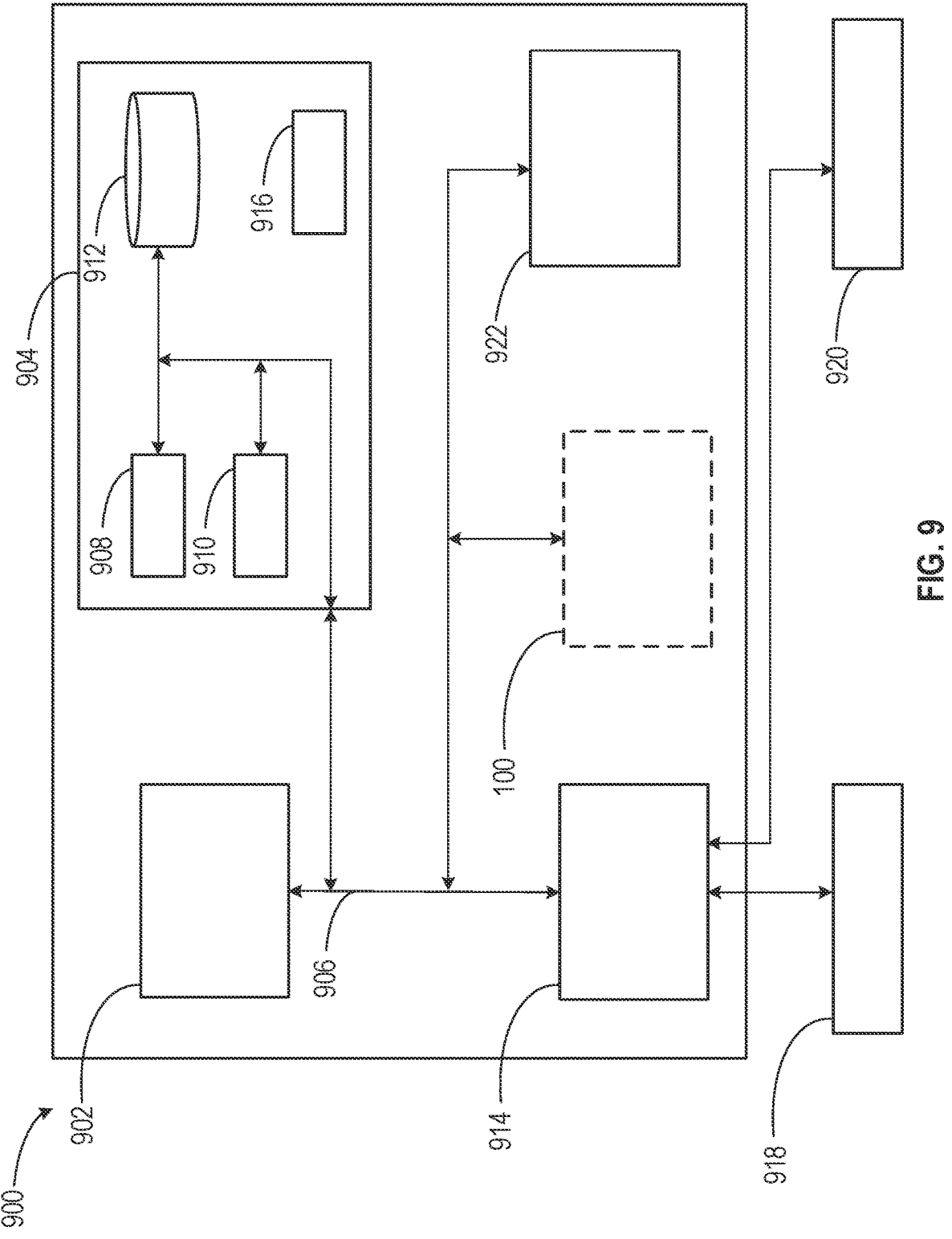
FIG. 9 depicts a block diagram of a computing system for a post-hoc black box explainer for univariate time series forecasters, according to at least one embodiment.

Embodiments of the present disclosure may be implemented together with virtually any type of computer, regardless of the platform is suitable for storing and/or executing program code. FIG. 9 shows, as an example, a computing system 900 (e.g., cloud computing system) suitable for executing program code related to the methods disclosed herein and for a post-hoc black box explainer for univariate time series forecasters.

The computing system 900 is only one example of a suitable computer system and is not intended to suggest any limitation as to the scope of use or functionality of embodiments of the present disclosure described herein, regardless, whether the computer system 900 is capable of being implemented and/or performing any of the functionality set forth hereinabove. In the computer system 900, there are components, which are operational with numerous other general purpose or special purpose computing system environments or configurations. Examples of well-known computing systems, environments, and/or configurations that may be suitable for use with computer system/server 900 include, but are not limited to, personal computer systems, server computer systems, thin clients, thick clients, hand-held or laptop devices, multiprocessor systems, micropro-cessor-based systems, set-top boxes, programmable con-sumer electronics, network PCs, minicomputer systems, mainframe computer systems, and distributed cloud com-puting environments that include any of the above systems or devices, and the like. Computer system/server 900 may be described in the general context of computer system-execut-able instructions, such as program modules, being executed by a computer system 900. Generally, program modules may include routines, programs, objects, components, logic, data structures, and so on that perform particular tasks or imple-ment particular abstract data types. Computer system/server 900 may be practiced in distributed cloud computing envi-ronments where tasks are performed by remote processing devices that are linked through a communications network. In a distributed cloud computing environment, program modules may be located in both, local and remote computer system storage media, including memory storage devices.

As shown in the figure, computer system/server 900 is shown in the form of a general-purpose computing device. The components of computer system/server 900 may include, but are not limited to, one or more processors 902 (e.g., processing units), a system memory 904 (e.g., a computer-readable storage medium coupled to the one or more processors), and a bus 906 that couple various system components including system memory 904 to the processor 902. Bus 906 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 900 typically includes a variety of computer system readable media. Such media may be any available media that is accessible by computer system/server 900, and it includes both, volatile and non-volatile media, removable and non-removable media.

The system memory 904 may include computer system readable media in the form of volatile memory, such as random-access memory (RAM) 908 and/or cache memory 910. Computer system/server 900 may further include other removable/non-removable, volatile/non-volatile computer system storage media. By way of example only, a storage system 912 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 906 by one or more data media interfaces. As will be further depicted and described below, the system memory 904 may include at least one program product having a set (e.g., at least one) of program modules that are configured to carry out the func-tions of embodiments of the present disclosure.

The program/utility, having a set (at least one) of program modules 916, may be stored in the system memory 904 by way of example, and not limiting, as well as an operating system, one or more application programs, other program modules, and program data. Program modules may include one or more of the input component 110, the feature component 120, the model component 130, and the explanation component 140, which are illustrated in FIG. 1. Each of the operating systems, one or more application programs, other program modules, and program data or some combination thereof, may include an implementation of a networking environment. Program modules 916 generally carry out the functions and/or methodologies of embodiments of the present disclosure, as described herein.

The computer system/server 900 may also communicate with one or more external devices 918 such as a keyboard, a pointing device, a display 920, etc.; one or more devices that enable a user to interact with computer system/server 900; and/or any devices (e.g., network card, modem, etc.) that enable computer system/server 900 to communicate with one or more other computing devices. Such commu-nication can occur via Input/Output (I/O) interfaces 914. Still yet, computer system/server 900 may communicate with one or more networks such as a local area network (LAN), a general wide area network (WAN), and/or a public network (e.g., the Internet) via network adapter 922. As depicted, network adapter 922 may communicate with the other components of computer system/server 900 via bus 906. It should be understood that, although not shown, other hardware and/or software components could be used in conjunction with computer system/server 900. Examples include, but are not limited to: microcode, device drivers, redundant processing units, external disk drive arrays, RAID systems, tape drives, and data archival storage systems, etc.

It is to be understood that although this disclosure includes a detailed description on cloud computing, imple-mentation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infra-structure. The applications are accessible from various client devices through a thin client interface such as a web browser (e.g., web-based e-mail). The consumer does not manage or control the underlying cloud infrastructure including net-work, servers, operating systems, storage, or even individual application capabilities, with the possible exception of lim-ited user-specific application configuration settings. In PaaS, the capability provided to the consumer is to deploy onto the cloud infrastructure consumer-created or acquired applica-tions created using programming languages and tools sup-ported by the provider. The consumer does not manage or control the underlying cloud infrastructure including net-works, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 10:
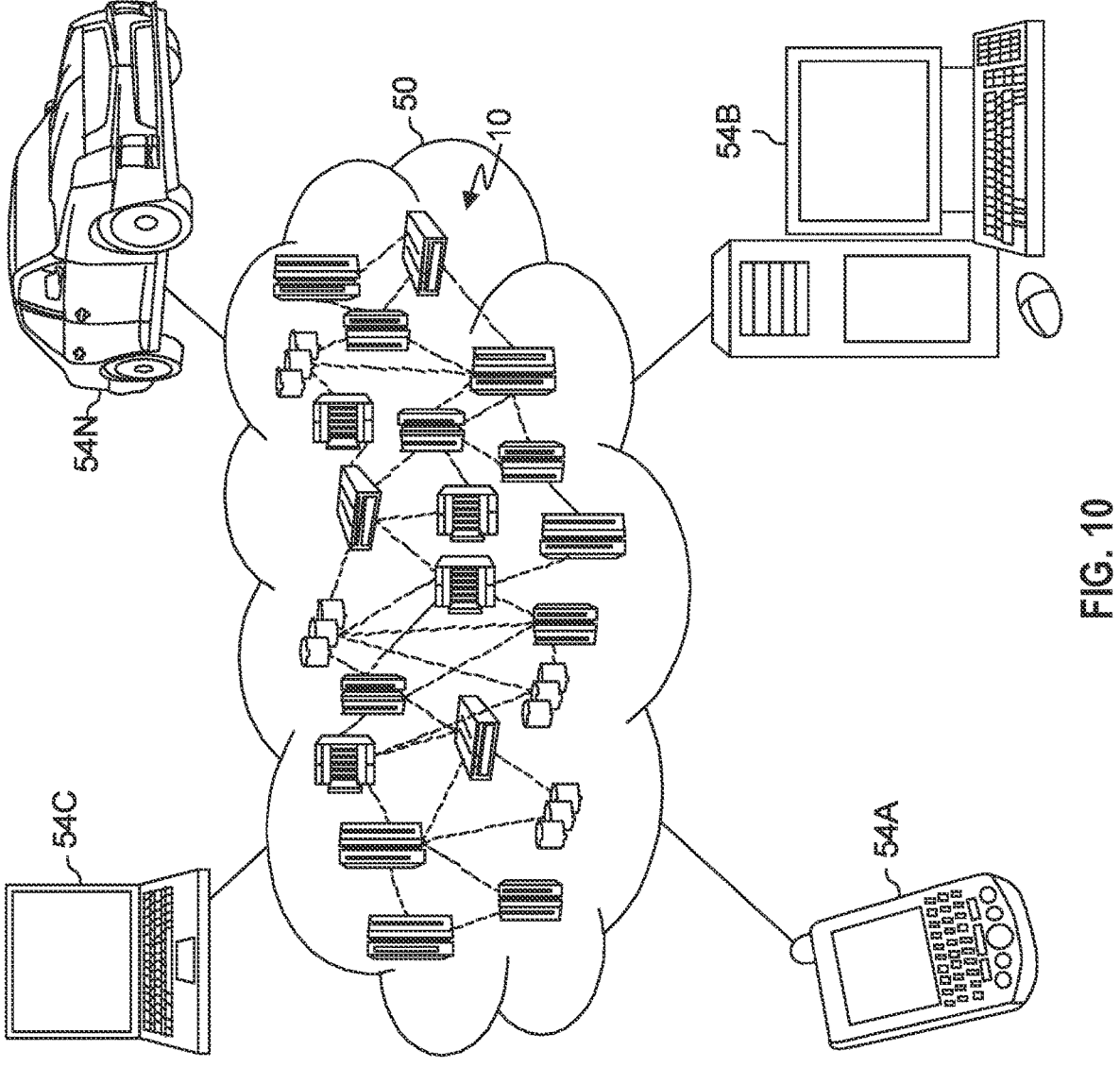
FIG. 10 is a schematic diagram of a cloud computing environment in which concepts of the present disclosure may be implemented, in accordance with an embodiment of the present disclosure.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
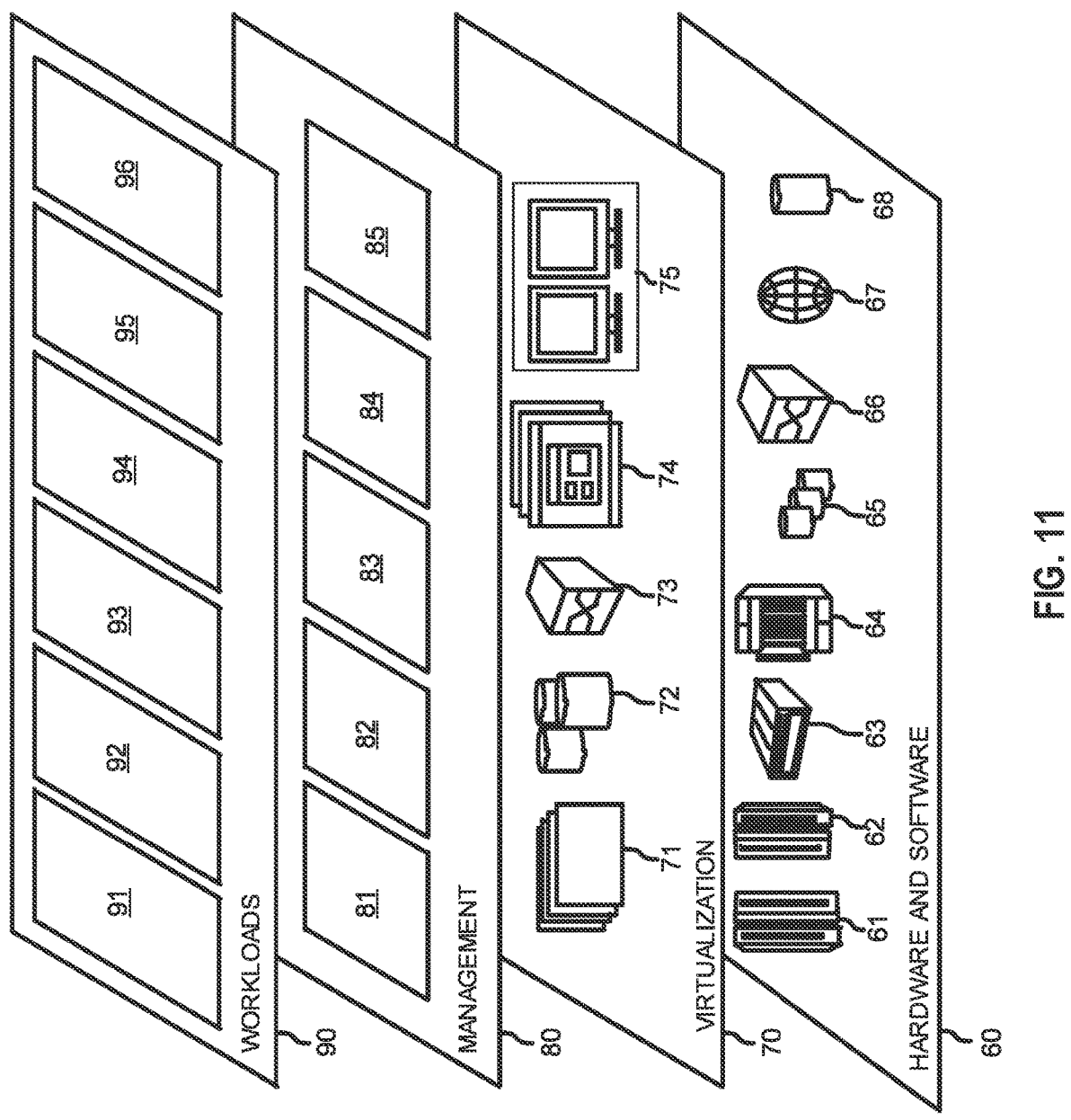
FIG. 11 is a diagram of model layers of a cloud computing environment in which concepts of the present disclosure may be implemented, in accordance with an embodiment of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and black-box explainer processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a set of time series forecasting predictions, the set of time series forecasting predictions generated from a set of black-box models trained with an initial data set;
generating a surrogate data set by backtesting one or more time series forecasting predictions of the set of time series forecasting predictions, the surrogate data set including a surrogate training set and a surrogate testing set;
generating a set of features based on at least a portion of the initial data set;
training a set of surrogate models based on the set of time series forecasting predictions and at least a portion of the set of features, wherein the at least a portion of the set of features comprises one or more features selected from the group consisting of lag features, seasonal lag features, rolling window features, expanding window features, date features, time features, encoding cyclical features, holiday features, and trend features;
selecting a subset of surrogate models; and
based on the subset of surrogate models, generating one or more explanation outputs for time series forecasting predictions of the set of black-box models.

2. The method of claim 1, wherein generating the set of features based on the portion of the initial data set further comprises:
identifying a global feature set for a training data set, the training data set being at least a portion of the initial data set subject to one or more data perturbation operations; and
selecting a subset of features from the global feature set as the set of features.

3. The method of claim 1, wherein training the set of surrogate models based on the set of time series forecasting predictions further comprises:
training the set of surrogate models with the surrogate training set; and
evaluating the set of surrogate models with the surrogate testing set.

4. The method of claim 3, wherein training the set of surrogate models further comprises:
fitting the set of surrogate models using a tree-based regressor based on a set of feature vectors associated with a set of time points associated with the surrogate training set.

5. The method of claim 1, wherein generating one or more explanation outputs further comprises:
aggregating explanation outputs of each surrogate model of the subset of surrogate models.

6. The method of claim 1, wherein the one or more explanation outputs explain a mean and a prediction interval for the set of time series forecasting predictions of the set of black-box models based on a relative contribution of each feature to a specified black-box model.

7. A system, comprising:
one or more processors; and
a computer-readable storage medium, coupled to the one or more processors, storing program instructions that, when executed by the one or more processors, cause the one or more processors to perform operations comprising:
receiving a set of time series forecasting predictions, the set of time series forecasting predictions generated from a set of black-box models trained with an initial data set;
generating a surrogate data set by backtesting one or more time series forecasting predictions of the set of time series forecasting predictions, the surrogate data set including a surrogate training set and a surrogate testing set;
generating a set of features based on at least a portion of the initial data set;
training a set of surrogate models based on the set of time series forecasting predictions and at least a portion of the set of features, wherein the at least a portion of the set of features comprises one or more features selected from the group consisting of lag features, seasonal lag features, rolling window features, expanding window features, date features, time features, encoding cyclical features, holiday features, and trend features;
selecting a subset of surrogate models; and based on the subset of surrogate models, generating one or more explanation outputs for time series forecasting predictions of the set of black-box models.

8. The system of claim 7, wherein generating the set of features based on the portion of the initial data set further comprises:

identifying a global feature set for a training data set, the training data set being at least a portion of the initial data set subject to one or more data perturbation operations; and selecting a subset of features from the global feature set as the set of features.

9. The system of claim 7, wherein training the set of surrogate models based on the set of time series forecasting predictions further comprises:

training the set of surrogate models with the surrogate training set; and evaluating the set of surrogate models with the surrogate testing set.

10. The system of claim 9, wherein training the set of surrogate models further comprises:

fitting the set of surrogate models using a tree-based regressor based on a set of feature vectors associated with a set of time points associated with the surrogate training set.

11. The system of claim 7, wherein generating one or more explanation outputs further comprises:

aggregating explanation outputs of each surrogate model of the subset of surrogate models.

12. The system of claim 7, wherein the one or more explanation outputs explain a mean and a prediction interval for the set of time series forecasting predictions of the set of black-box models based on a relative contribution of each feature to a specified black-box model.

13. A computer program product comprising a computer readable storage medium having program instructions embodied therewith, the program instructions being executable by one or more processors to cause the one or more processors to perform operations comprising:

receiving a set of time series forecasting predictions, the set of time series forecasting predictions generated from a set of black-box models trained with an initial data set;

generating a surrogate data set by backtesting one or more time series forecasting predictions of the set of time series forecasting predictions, the surrogate data set including a surrogate training set and a surrogate testing set;

generating a set of features based on at least a portion of the initial data set;

training a set of surrogate models based on the set of time series forecasting predictions and at least a portion of the set of features, wherein the at least a portion of the set of features comprises one or more features selected from the group consisting of lag features, seasonal lag features, rolling window features, expanding window features, date features, time features, encoding cyclical features, holiday features, and trend features;

selecting a subset of surrogate models; and based on the subset of surrogate models, generating one or more explanation outputs for time series forecasting predictions of the set of black-box models.

14. The computer program product of claim 13, wherein generating the set of features based on the portion of the initial data set further comprises:

identifying a global feature set for a training data set, the training data set being at least a portion of the initial data set subject to one or more data perturbation operations; and selecting a subset of features from the global feature set as the set of features.

15. The computer program product of claim 13, wherein training the set of surrogate models based on the set of time series forecasting predictions further comprises:

training the set of surrogate models with the surrogate training set; and evaluating the set of surrogate models with the surrogate testing set.

16. The computer program product of claim 15, wherein training the set of surrogate models further comprises:

fitting the set of surrogate models using a tree-based regressor based on a set of feature vectors associated with a set of time points associated with the surrogate training set.

17. The computer program product of claim 13, wherein the one or more explanation outputs explain a mean and a prediction interval for the set of time series forecasting predictions of the set of black-box models based on a relative contribution of each feature to a specified black-box model and generating the one or more explanation outputs further comprises:

aggregating explanation outputs of each surrogate model of the subset of surrogate models.

* * * * *